United States Patent [19]

Wakayama et al.

[11] Patent Number: 4,913,538

[45] Date of Patent: Apr. 3, 1990

[54] FOLDING BINOCULARS

[76] Inventors: Shouji Wakayama; Akio Akiyama, both c/o Young Optical Co., Ltd. No. 2-16-12, Tateishi, Katsushika-ku, Tokyo, Japan

[21] Appl. No.: 244,476

[22] Filed: Sep. 15, 1988

[30] Foreign Application Priority Data

Nov. 17, 1987 [JP] Japan .......................... 62-175166[U]

[51] Int. Cl.[4] .............................................. G02B 23/18
[52] U.S. Cl. ..................................... 350/546; 350/140
[58] Field of Search ............... 350/545, 546, 140, 145, 350/146

[56] References Cited

U.S. PATENT DOCUMENTS

| 91,969 | 6/1869 | Saxton | 350/546 |
|---|---|---|---|
| 1,024,730 | 4/1912 | Levy | 350/546 |
| 2,002,782 | 5/1935 | Lester | 350/546 |
| 4,574,505 | 3/1986 | Chiodo | 350/140 |

FOREIGN PATENT DOCUMENTS

| 372907 | 4/1923 | Fed. Rep. of Germany | 350/546 |
|---|---|---|---|
| 395535 | 3/1909 | France | 350/546 |
| 423739 | 4/1911 | France | 350/546 |
| 22211 | of 1894 | United Kingdom | 350/546 |
| 9889 | of 1904 | United Kingdom | 350/546 |

Primary Examiner—Rodney B. Bovernick
Assistant Examiner—Martin Lerner
Attorney, Agent, or Firm—Witherspoon & Hargest

[57] ABSTRACT

Folding binoculars having a pair of eyepiece frames and a pair of objective frames which are swingably supported by the rear and front edges of a pair consisting of left and right cover frames that can open and close with respect to each other. The binoculars become usable when the cover frames are swung open, thereby allowing the eyepiece and objective frames to be raised and set up by virtue of the resilience of set-up springs, and thereby aligning the optical axes of eyepieces and objectives. When the cover frames are swung to close and, accordingly, when the eyepiece or objective frames are moved toward each other to contact each other, the lens frames become guided by folding guide portions formed on the inner edges of the lens frames by virtue of contact between these guide portions, whereby the eyepiece and object frames are swung against the resilience of the springs, and they become folded and received within the frame covers. Thus, the folding binoculars can be folded to form a compact structure when they are not in use.

6 Claims, 3 Drawing Sheets

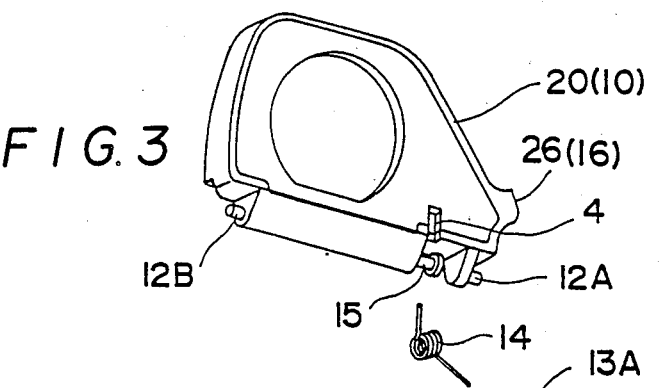
FIG.3
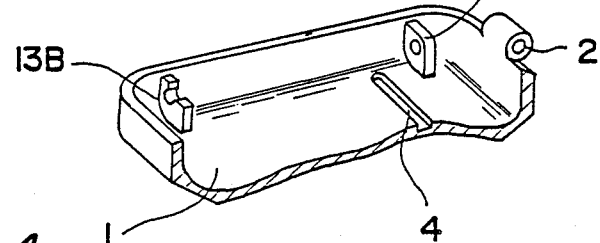
FIG.4
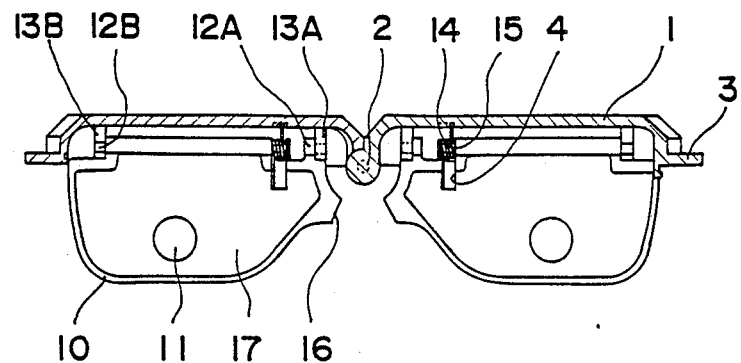
FIG.5
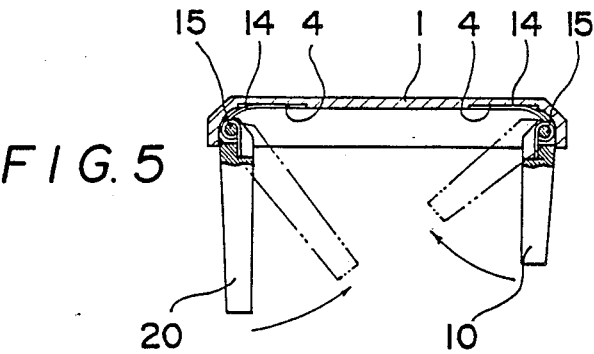

FOLDING BINOCULARS

BACKGROUND OF THE INVENTION

1. Field of the Invention

The present invention relates to a pair of folding binoculars in which a pair of eyepiece frames and a pair of objective frames can be folded and received within a pair consisting of left and right cover frames that are able to open and close with respect to each other, the binoculars being rendered usable when the left and right cover frames are swung open and the eyepiece frames and the objective frames are raised and set up, the binoculars being capable of being folded to form a compact structure when they are not in use.

2. Prior Art

Folding binoculars of various structures and types have hitherto been proposed, which may be used as opera glasses for watching theatrical plays or sports such as baseball games, soccer games, and boxing matches.

However, conventionally-proposed folding binoculars are heavy because they are made of metals and comprise a lot of component parts. Further, they are large-sized and cannot be carried easily. They are also disadvantageous in that manufacturing processes are complicated and production costs are very high.

To cope with these disadvantages, the present applicant has previously proposed, in Japanese Utility Model Laid-Open No. 50920/1986, folding binoculars having a case comprising a base body and a lid body mounted on an eyepiece base portion in such a manner as to be able to open and close, objective supporting frames accommodated within the case and adapted to be set up and pushed down by virtue of springs, and a position adjusting mechanism for adjusting the movement of eyepieces in the to-and-fro direction. The component parts of the binoculars are formed of synthetic resins, thereby allowing the binoculars to be very light and be manufactured at low production costs.

With these binoculars, however, since the eyepieces are connected to the position adjusting mechanism via the eyepiece base portion, the objective supporting frames alone are adapted to be set up and pushed down. As a result, even when the objective supporting frames are pushed down and the entire structure is made compact in this way, the thus achieved structure cannot be thinner than the diameter of the eyepieces. Therefore, with the above-described folding binoculars, it has been possible to make the entire structure compact only to a limited extent.

In recent years, various daily necessities and sundries have become fashionable and colorful, and binoculars have been showing the same tendency. From this viewpoint, the binoculars that have conventionally been proposed as well as the binoculars that have previously been proposed by the present applicant have an outer appearance which maintains a basic configuration of a pair of binoculars even after the entire structure has been made thin and compact. Thus, the folding of these binoculars has not been able to provide a shape which is surprising or interesting, so to speak.

SUMMARY OF THE INVENTION

The present invention has been accomplished in view of the above-described circumstances, and an object of the present invention is to provide folding binoculars which have fundamental functions required of a pair of binoculars, and which are simultaneously able to make the entire structure more compact and more convenient to carry, and are further able to provide a surprising and interesting external shape.

To this end, according to the present invention, there is provided folding binoculars comprising: a pair consisting of left and right cover frames which are swingably supported by a support in such a manner as to be able to open and close with respect to each other; a pair consisting of left and right eyepiece frames which are each provided with an eyepiece; a pair consisting of left and right objective frames which are each provided with an objective, the eyepiece frames and the objective frames, namely the lens frames, being swingably supported by the rear edge and the front edge of the cover frames, respectively; folding guide portions consisting of first folding guide portions which are each formed on the inner edge of each of the eyepiece frames, and second folding guide portions which are each formed on the inner edge of each of the objective frames; and set-up springs having resilience and urging each the lens frames in the direction in which the lens frames are raised toward the outside of the cover frames, wherein, when the cover frames are swung toward each other to close and, accordingly, when the left and right eyepiece frames are moved toward each other to contact each other while the left and right objective frames are moved toward each other to contact each other, the folding guide portions which are formed on the inner edges of the eyepiece frames and the objective frames guide the eyepiece frames and the objective frames in such a manner that the lens frames are swung and are thus folded toward the inside of the cover frames against the resilience of the set-up springs.

With the folding binoculars in accordance with the present invention, when the binoculars are to be used, the cover frames are swung open from their closed state.

By this operation, the resilience of the set-up springs, that urges the left and right eyepiece frames and the left and right objective frames in the direction in which the lens frames are raised toward the outside of the cover frames, causes the lens frames to be set up on the cover frames, thereby aligning the optical axes of the eyepieces and those of the objectives.

With this condition, the binoculars are used as ordinary binoculars when a person looks through the eyepieces provided in the eyepiece frames.

After use, when the cover frames are swung toward each other so that they are closed, the left and right eyepiece frames and the left and right objective frames are moved in such a manner that their folding guide portions are brought into contact, thereby achieving sliding contact between the folding guide portions of the eyepiece frames and between those of the objective frames. With the folding guide portions being in sliding contact in this manner, they guide the lens frames in such a manner that the lens frames are swung and are thus folded toward the inside of the cover frames against the resilience of the set-up springs.

BRIEF DESCRIPTION OF THE DRAWINGS

The drawings illustrates certain embodiments of the present invention, in which

FIG. 3 is a partially-sectioned exploded perspective view of essential parts of the folding binoculars;

FIG. 4 is a sectional view of the folding binoculars, taken through a plane including the axis of swinging of eyepiece frames;

FIG. 5 is a sectional view of the folding binoculars, taken through a plane including a line connecting set-up springs;

DESCRIPTION OF THE PREFERRED EMBODIMENTS

Certain embodiments of the present invention will be described hereunder with reference to the drawings.

Figure 6:
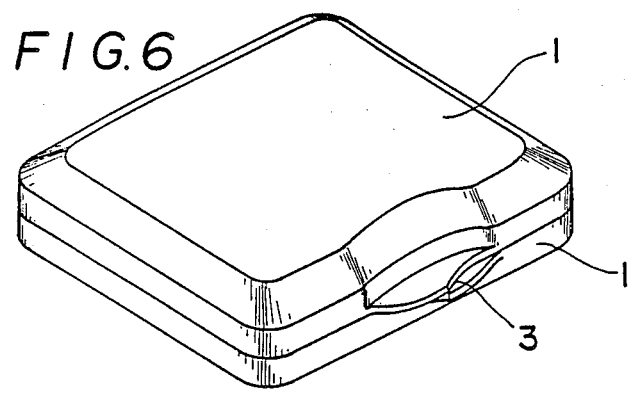
FIG. 6 is a perspective view of the folding binoculars which are in a state in which lens frames are already folded and received in the cover frames.

Folding binoculars in accordance with the present invention comprises a pair consisting of left and right recessed cover frames 1 which are swingably supported by a support 2 and are coupled to each other via the support 2 in such a manner as to be able to open and close with respect to each other, and a pair of eyepiece frames 10 and a pair of objective frames 20 which form pairs thereof at rear and front positions of the cover frames 1. The eyepiece frames 10 and the objective frames 20 can be folded and received within the cover frames 1. When the binoculars are folded, they form a rather thick body having a substantially rectangular planar configuration, as shown in FIG. 6.

Each of the cover frames 1 is formed with a box-shape which is relatively shallow but deep enough to receive the eyepiece frames 10 and the objective frames 20 when these lens frames are folded. The cover frames 1 are swingably supported by the support 2 provided at the joint of two adjacent lateral edges of the frames 1. The support 2 has an arrangement in which, for instance, an axial pin is passed though hole-shaped bearings formed on those lateral edges of the frames 1 and superimposed one another, or shaft portions provided on one of the frames 1 are combined with bearing portions provided on the other. Thus, the cover frames 1 are threaded onto the support 2 so as to be able to swing, with their recesses facing each other.

The arrangement of the cover frames 1 should preferably be such that their opening and closing is carried out with a little tightness, so that the frames 1 can be kept at an arbitrary angle, for instance, after opening. With this arrangement, the distance between eyepieces 11 provided in the eyepiece frames 10 can be adjusted in accordance with the interval between the user's eyes.

In order to enable a smooth operation of opening or closing the cover frames 1, knobs 3 are provided on the the opening edges of the frames 1. The configuration and structure of the knobs 3 may be selected from various choices. For instance, the knobs may be engageable with each other, or they may be hook-shaped. During use, the knobs 3 may also be used as handles by which the user holds the binoculars.

Figure 1:
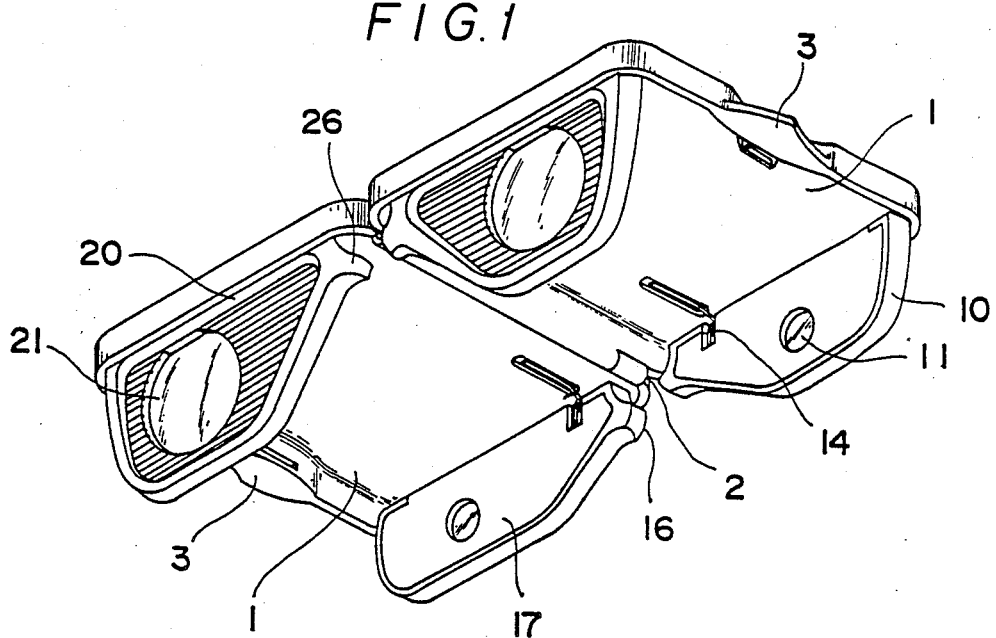
FIG. 1 is a perspective view of folding binoculars in accordance with one embodiment of the present invention, showing a state in which cover frames are open and the binoculars are usable.

The eyepiece frames 10 or the objective frames 20 are swingably supported on the rear or front edges, that is, the edges of the cover frames that are normal to the support 2, in such a manner that the frames 10 and 20 can be swung toward the inside of the cover frames 1 against certain resilience. The structure for supporting the frames 10 and 20 is such that, when these lens frames are set-up on the cover frames 1, as shown in FIG. 1, the optical axes of the eyepieces 11 and those of objectives 21 are aligned.

The structure for supporting the lens frames 10 and 20 are shown in FIGS. 3 to 5. Shaft portions 12A and 12B project from either end of the upper edge of each of the lens frames 10 and 20. The shaft portions 12A are fitted into loop-shaped bearings 13A which are each formed at one end of the inner surface of the front or rear edge of each of the lens frames. Hook-shaped bearings 13B are each formed at the other end of the inner surface of the front or rear edge of each of the lens frames. and, when the lens frames 10 and 20 are swung about the shaft portions 12A. the shaft portions 12B are forcibly fitted into the hook-shaped bearings 13B. In this way, the lens frames 10 and 20 are supported swingably about the shaft portions 12A and 12B formed at either ends of the upper edges of the frames 10 and 20. On the axes of swinging of the lens frames 10 and 20, set-up springs 14 are provided. The set-up springs 14 have resilience and always urge the lens frames 10 and 20 in the direction in which the frames 10 and 20 are raised toward the outside of the cover frames 1.

In the illustrated embodiments, the shaft portions 12A and the loop-shaped bearings 13A are positioned on the side of the cover frames 1 that is close to the support 2, while the shaft portions 12B and the hook-shaped bearings 13B are located on the other side of the cover frames 1, i.e.. the side that is remote from the support 2 and that is closer to the opening edges. However, the shaft portions 12A and 12B and the bearings 13A and 13B may be positioned on either side in this respect Spring shafts 15 are provided in such a manner as to extend along the axes of the shaft portions 12A and 12B, and the set-up springs 14 are mounted on the spring shafts 15. The portions of the spring shafts 15 where the set-up springs 14 are mounted are reduced in diameter, thereby attaining a snug fitting and, hence, a stable mounting of the spring 14. Although in the illustrated embodiments, the spring shafts 15 are positioned in the vicinity of the shaft portions 12A that is close to the support 2 of the cover frames 1, the spring shafts 15 may alternatively be positioned on the other, i.e., the opening, side of the cover frames 1 that is remote from the support 2.

Further, although in the illustrated embodiments, the set-up springs 14 are coil-shaped, they may alternatively be plate-shaped springs.

Figure 8:
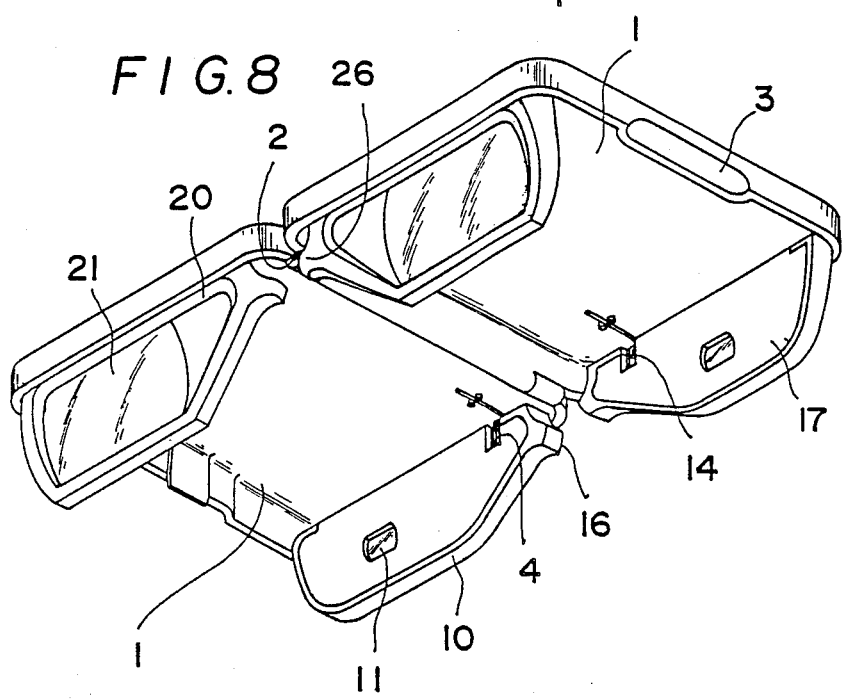
FIG. 8 is a perspective view of folding binoculars in accordance with another embodiment of the present invention.

Reference numeral 4 denotes spring stoppers which are groove-shaped and are formed in the inner surfaces of the cover frames 1 and the reverse surfaces of the lens frames and 20, for the purpose of preventing the displacement of the end portions of the set-up springs 14, thereby enabling the springs 14 to exert adequate resilience. Alternatively, the spring stoppers 4 may be a plurality of pairs of projections, as shown in FIG. 8.

Figure 2:
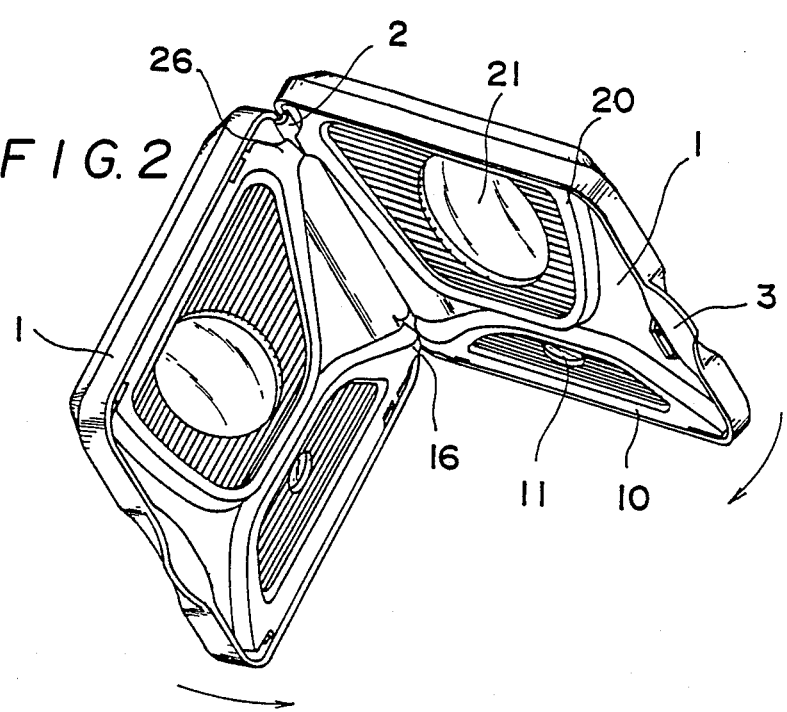
FIG. 2 is a perspective view of the folding binoculars which are being folded.

Folding guide portions 16 are formed on the inner edges of the eyepiece frames 10, and folding guide portions 26 are formed on the inner edges of the objective frames 20. By virtue of the provision of the folding guide portions 16 and 26, when the cover frames 1 are swung toward each other to close and, accordingly, when the pair consisting of the left and right eyepiece frames 10 and the pair consisting of the left and right objective frames 20 are moved toward each other to contact each other, the folding guide portions 16 and 26, which are formed on the inner edges of the eyepiece frames 10 and the objective frames 20, respectively, guide the eyepiece frames 10 and the objective frames 20, respectively, in such a manner that each of the pairs of the lens frames 10 and 20 are folded toward the inside of the cover frames 1. Each of the folding guide portions 16 and 26 is positioned on the side of the lens frame that is closer to the support 2 of the cover frames 1, and it is formed as a projection. The outer surface of each folding guide portion 16 or 26 is curved so as to achieve smooth sliding contact between the portions 16 or 26 after they have been brought into contact. The folding guide portions 16 or 26 which are in sliding contact with each other guide the lens frames 10 or 20 in such a manner that the lens frames are folded toward the inside of the cover frames, as shown in FIG. 2.

In order to attain smooth guiding by the folding guide portions 16 and 26, the mating inner edges of each of the lens frames 10 or 20 are formed in such a manner that the distance between these inner edges increases toward the free edges of the lens frames 10 or 20. Accordingly, as shown in the drawings, each of the lens frames 10 and 20 has a trapezoidal configuration when viewed from the front.

Each of the eyepieces 11 and the objectives 21 may be provided in the corresponding eyepiece frame 10 or objective frame 20 by fitting, fixing by means of an adhesive, fixing by means of ultrasonic waves, or integral formation. An arrangement shown in FIGS. 3 may alternatively be adopted in which each lens 11 or 21 is fitted into a recess formed in the reverse surface of a fixing support frame member 17, and the member 17 with the lens 11 or 21 is fitted into and fixed to the frame 10 or 20.

Figure 7:
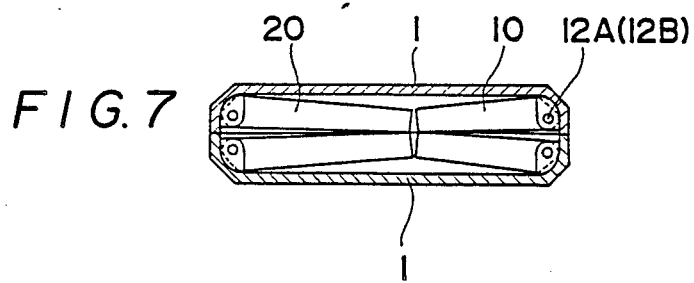
FIG. 7 is a sectional view of the folding binoculars in the state shown in FIG. 8.

The eyepieces 11 have a small diameter and the objectives 21 have a large diameter and, accordingly, the eyepiece frames 10 are formed to be slightly smaller than the objective frames 20. Taking these facts into consideration, the size of the receiving portion of the cover frames 1 is set (see FIG. 7). So long as telescopic functions are provided, it is not particularly specified as to whether the material for the eyepieces 11 and the objectives 21 should be glass or plastic, and as to whether the configuration of the lens 11 or 21 should be circular, as shown in FIGS. 1 to 3, or elongated-ellipse-shaped, i.e., , as shown in FIG. 8.

Next, an example of the use of the folding binoculars will be explained. When the cover frames 1 are swung open, as shown in FIGS. 2 and 1, this operation allows the eyepiece frames 10 and the objective frames 20 to be set up on the cover frames 1 by virtue of the resilience of the set-up springs 14. With the lens frames 10 and 20 being set up, the axes of the eyepieces 11 and the axes of the objectives 21 are aligned (see FIGS. 4 and 5). When the user looks through the eyepieces 11 provided in the eyepiece frames 10, the folding binoculars are used as ordinary binoculars.

After use, when the cover frames 1 are swung toward each other to close, the left and right eyepiece frames 10 and the left and right objective frames 20 are moved in such a manner that their folding guide portions 16 and 26, respectively, are moved toward each other to contact each other. With the folding guide portions 16 or 26 being in sliding contact, the folding guides 16 or 26 act to guide the lens frames 10 or 20 in such a manner that the lens frames are folded inward against the resilience of the set-up spring 14, as shown in FIG. 5. In consequence, the eyepiece frames 10 are folded toward the objective frames 20, and vice versa, whereby the eyepiece frames 10 and the objective frames 20 become received within the cover frames 1 in a state of being folded down. With this state, the folding binoculars have a compact overall configuration which is rectangular when viewed on a plane (see FIG. 7).

The folding binoculars in accordance with the present invention have the above-described construction. With these folding binoculars, they can be folded to form a compact structure when they are not in use. When they are to be used, they can be rendered useful as ordinary binoculars simply by causing the left and right cover frames 1 to be swung open, thereby allowing the eyepiece frames 10 and the objective frames 20 to be set-up at rear and front positions of the thus opened cover frames 1. After use, the folding binoculars can simply be returned to their non-use state by causing the cover frames 1, from the outside of the frames 1, to be swung toward each other to close.

This effect is provided by virtue of an arrangement in which a pair consisting of left and right cover frames 1 are swingably supported by a support in such a manner as to be able to open and close with respect to each other, and lens frames, namely, a pair consisting of left and right eyepiece frames 10, each provided with an eyepiece 11, and a pair consisting of left and right objective frames 20, each provided with an objective 21, are swingably supported by the rear edge and the front edge of the cover frames 1, respectively. Folding guide portions 16 and 26 consist of first folding guide portions 16 which are each formed on the inner edge of each of the eyepiece frames 10, and second folding guide portions 26 which are each formed on the inner edge of each of the objective frames 20. Set-up springs 14 having resilience urge each of the eyepiece frames 10 and the objective frames 20 in the direction in which the lens frames are raised toward the outside of the cover frames 1. When the cover frames 1 are swung toward each other to close and, accordingly, when the left and right eyepiece frames 10 are moved toward each other to contact each other while the left and right objective frames 20 are moved toward each other to contact each other, the folding guide portions 16 and 26 which are formed on the inner edges of the eyepiece frames 10 and the objective frames 20 guide the eyepiece frames 10 and the objective frames 20 in such a manner that the lens frames 10 and 20 are swung and are thus folded toward the inside of the cover frames 1 against the resilience of the set-up springs 14. Thus, the folding binoculars of the present invention have basic functions required of a pair of binoculars, and they are simultaneously able to make the entire structure compact and portable to an enhanced extent, and are further able to provide a surprising and interesting external shape.

In view of the fact that various daily necessities and sundries have recently become fashionable and colorful, the folding binoculars of the present invention are also advantageous in practical terms. For instance, when they are in the folded state forming a compact structure, their outer appearance does not suggest that they are a pair of binoculars, thereby rendering the binoculars very interesting and new.

What is claimed is:

1. Folding binoculars, comprising:

a pair consisting of left and right cover frames which are swingably supported by a support in such a manner as to be able to open and close with respect to each other, each of said cover frames having a respective rear edge and a respective front edge;

a pair consisting of left and right eyepiece frames which are each provided with an eyepiece, each of said eyepiece frames having a respective inner edge;

a pair consisting of left and right objective frames which are each provided with an objective, each of said objective frames having a respective inner edge;

each eyepiece frame and each objective frame being swingably supported by the rear edge and the front edge of a respective of one of said cover frames;

folding guide portions comprising first folding guide portions which are each formed on the inner edge of each of said eyepiece frames, and second folding guide portions which are each formed on the inner edge of each of said objective frames; and set-up springs having resilience and urging respective eyepiece frames and respective objectives frames such that said respective eyepiece frames and said respective objective frames are raised in a first direction relative to said cover frames, and wherein, when said cover frames are swung toward each other to close and, accordingly, when said left and right eyepiece frames are moved toward each other to contact each other while said left and right objective frames are moved toward each other to contact each other, said folding guide portions which are formed on respective inner edges of said eyepiece frames and said objective frames guide said eyepiece frames and said objective frames in such a manner that said eyepiece frames and said objective frames are swung and are thus folded in an opposite second direction relative to said cover frames against the resilience of said set-up springs.

2. Folding binoculars according to claim 1, wherein each of said folding guide portions is in the form of a projection which is positioned on the side of each of the lens frames that is close to said support of said cover frames, each of said folding guide portions having a curved outer surface.

3. Folding binoculars according to claim 1, further comprising spring shafts which each extend along an axis passing through said first and second shaft portions of each of the lens frames, each of said set-up springs is disposed on each of said spring shafts.

4. Folding binoculars according to claim 1, wherein each eyepiece frame and objective frame has first and second shaft portions which project from either end of an upper edge of said eyepiece frame and said objective frame, and each of said cover frames has loop-shaped bearings which are formed at one end of inner surfaces of the front and rear edges of the cover frame and also has hook-shaped bearings which are formed at another end of the inner surfaces of the front and rear edges of the cover frame, the first shaft portions being fitted into said loop-shaped bearings of said cover frames, the second shaft portions being adapted to be forcibly fitted into said hook-shaped bearings of said cover frames when the lens frames are swung about said first shaft portions whereby the eyepiece frames and objective frames are supported in such a manner as to be swingable about the shaft portions formed at either ends of the upper edges thereof, said resilient set-up springs being each provided on an axis of swinging of each of the eyepiece frames and objective frames.

5. Folding binoculars according to claim 4, wherein each of said folding guide portions is in the form of a projection which is positioned on the side of each of the lens frames that is close to said support of said cover frames, each of said folding guide portions having a curved outer surface.

6. Folding binoculars according to claim 4, further comprising spring shafts which each extend along an axis passing through said first and second shaft portions of each of the lens frames, each of said set-up springs is disposed on each of said spring shafts.

* * * * *